Dec. 9, 1952    R. R. ADAMS ET AL    2,620,823
TRACER VALVE MECHANISM WITH DASHPOT
Filed July 8, 1947
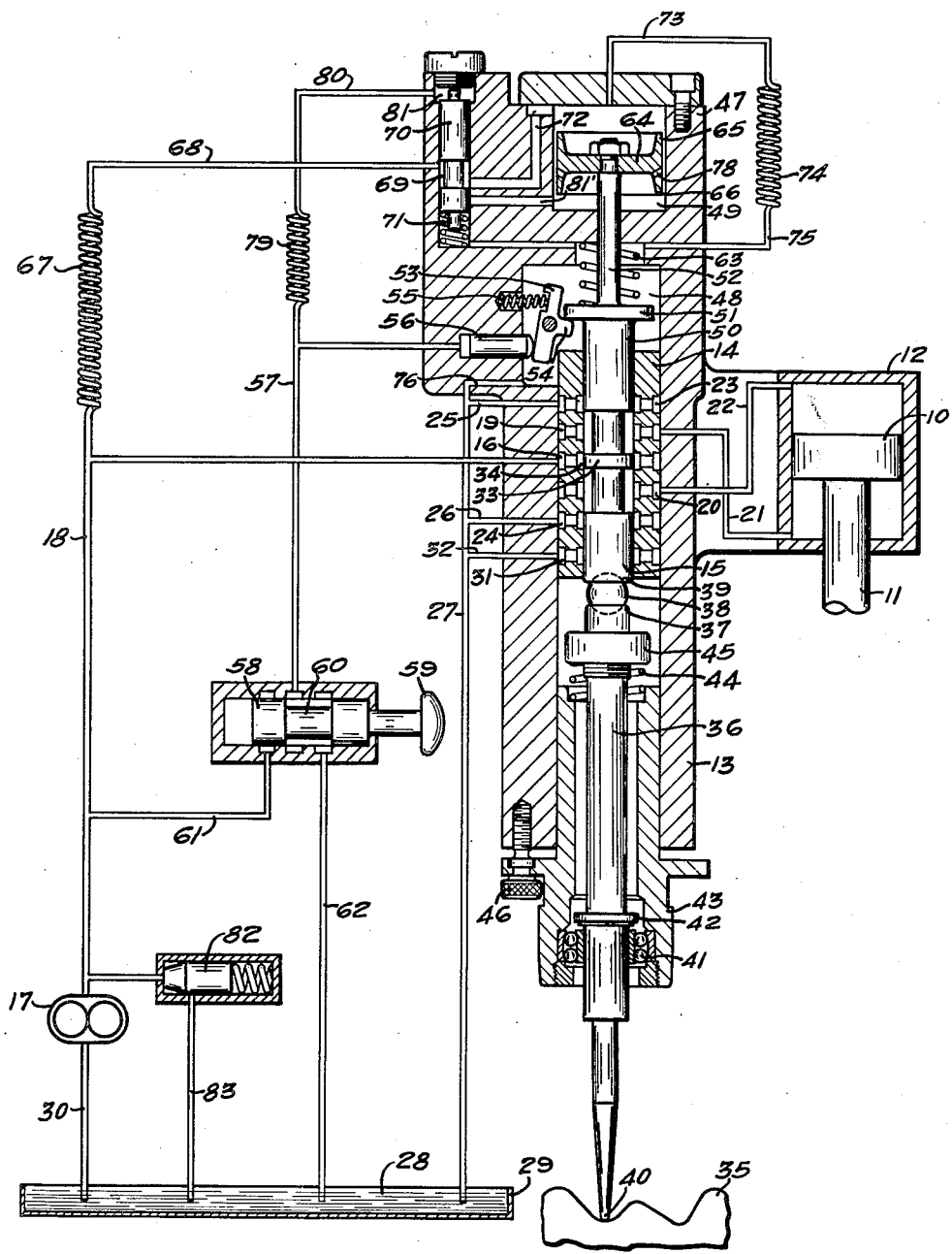
INVENTOR.
ROBERT R. ADAMS
RAYMOND D. WORTENDYKE
BY
H. K. Parsons & L. W. Wright.
ATTORNEYS Patented Dec. 9, 1952

2,620,823

UNITED STATES PATENT OFFICE 2,620,823

TRACER VALVE MECHANISM WITH DASHPOT

Robert R. Adams and Raymond D. Wortendyke, Cincinnati, Ohio, assignors to The Cincinnati Milling Machine Co., Cincinnati, Ohio, a corporation of Ohio Application July 8, 1947, Serial No. 759,620

9 Claims. (Cl. 137—619)

1

This invention relates to improvements in mechanisms particularly of the hydraulically actuated type for accurate determination of the relative movement of a cutting tool and a work piece in accordance with pattern effected deflections of a tracer valve controlling stylus and to the various mechanisms for controlling the reactions of the valve as respects the operating motor controlled thereby.

One of the principal objects of the present invention is the provision of a free-acting tracer unit or assembly of extreme sensitivity which will so control the motive means effecting relative movement between tool and work that the contour produced by the cutter will be an accurate reproduction of the surface of the pattern irrespective of the angularity of said surface.

A further object of the invention is the provision of a structure of this character embodying improved means for preventing hunting or vibration of the tracer and controlled valve elements under difficult operating conditions.

An additional object is the provision of improved damping means effective during tracer controlled operation of the machine tool, together with means for releasing the damping mechanism when it is desired to discontinue the tracer determined operation of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawing in which like reference numerals indicate like or similar parts:

The single figure is a vertical sectional view of the control valves and tracer mechanism, the hydraulic connections being diagrammatically indicated.

It will be understood that the mechanism in question is adapted for application to various known types of machine tools, as for example the milling and profiling machine shown in Patent 2,068,889, in which there is illustrated a profiling machine having a vertically movable tool head shiftable by piston and cylinder mechanism and having mounted thereon a tracer valve body for control of the movement of the head.

In the present drawing there has been illustrated the piston 10 having the piston rod 11 adapted to be secured to a stationary portion of

2 the machine. This piston is movable in the power cylinder 12 which is coupled with the tool head (not here illustrated) and with the tracer valve casing or body 13. Consequently, introduction of pressure into the upper end of cylinder 12 will raise the member 13 in the manner indicated in Patent 2,068,889.

Secured within the tracer housing 13 is the ported bushing 14 cooperating with the tracer valve 15. The bushing is provided with the central port 16 receiving the actuating pressure fluid supplied by pump 17 through conduit system 18. The bushing is further provided with the ports 19 and 20. Port 19 is connected by conduit 21 with the lower end of cylinder 12. Port 20 is connected by conduit 22 with the upper portion of said cylinder. The bushing is further provided with the upper low pressure or return port 23 and lower port 24 coupled by conduits 25 and 26 with the return system 27 conducting the exhaust pressure fluid 28 back into reservoir 29, from which it may be drawn through pump intake conduit 30 for recirculation. An additional lower drain port is provided at 31 coupled by conduit 32 with the return system 27.

It will be noted that the valve member 15 is provided with a central spool at 33 substantially the same width as the pressure groove 34 on the inner face of the bushing communicating with the port or ports 16. This spool is preferably formed with sharp shoulders of a width so as to provide .001″ underlap as respects the groove so that when it is in its centralized position there will be a minimized potential flow therearound toward the conduits 21 and 22 until a balanced condition has been established.

In the utilization of the invention a work piece and a contour pattern 35 are ordinarily supported as a unit in the machine, and the tracer housing and cutting tool as a second unit, and suitable means are employed for effecting relative traversing movement of the respective unit pairs. In order that the valve may react in accordance with the contour of the pattern 35 to control the tool position, there is provided the tracer stylus 36 formed at its upper end with a socket 37 to receive ball 38 having its upper portion engaged in socket 39 in the lower end of the valve 15, this stylus having a tracer point 40 riding on the contoured face of the pattern 35. A rotary oscillatable bearing 41 having its inner race engaging the stylus with a slip fit and its outer race secured in the sleeve 43 adjustably mounted in housing 13, serves to mount the stylus for oscillatory and longitudinal sliding movements, the downward movement of the stylus being limited by interengagement of the flange 42 and the upper end of the inner bearing race. A spring 44, interposed between the upper portion of sleeve 43 and a collar 45 threaded on the stylus, serves to urge the stylus upward in a direction to maintain ball 38 against the lower end of the valve 15.

It will be noted that collar 45 is adjustable on the stylus to vary the spring pressure while sleeve 43 may be adjusted as by screw 46 to raise or lower the stylus and valve unit as an entirety.

From the foregoing it will be evident that when the stylus is pushed upwardly as by an eminence on the pattern 35, the valve spool 33 will be displaced so that pressure from pump 17 will flow through conduits 18 and 22 into the upper end of cylinder 12 correspondingly raising the housing 13 until the contained valve bushing moves in correspondence with the amount of displacement of the spool to create a balanced pressure condition within the two ends of cylinder 12, maintaining the parts in the newly established position. On the other hand, as the stylus and valve move downward, the housing 13 and associate parts will correspondingly shift an equal amount.

It will be evident that for most accurate reproduction of the pattern contour or surface on the work piece by the tool, it is necessary that the actual effected tool movement corresponds exactly with the movement of point 40. To stabilize this condition and prevent a hunting or vibrating action of the valve, as, for example, when the tracer is riding up or down steep slopes or curves, there has been provided the vibration dampening mechanism particularly illustrated in the upper part of Figure 1. As there shown, the housing has an enlarged portion 47 providing a first chamber 48 and a second dampening chamber 49. The valve body 15 has a cylindrical upward extension 50 projecting beyond the valve bushing into chamber 48 and provided with a lifter flange 51 and a reduced upward extension 52. A rock lever 53 has a finger 54 extending beneath the flange 51 and is normally swung into disengaging position, permitting free movement of the valve by means of spring 55, reacting against the upper end of the lever. A hydraulic plunger 56 is slidably mounted in the housing portion 47 and actuable by introduction of hydraulic pressure medium through conduit 57 to rock the lever and its finger in a counterclockwise direction, imparting pronounced upward movement to the valve, rendering the tracer stylus ineffective and coupling pressure from conduit 18 through 22 to the upper end of the cyinder to retract the parts to an extreme upward position. Actuation of this plunger 56 is effected as by valve 58 having an operating portion 59 and a cannelure 60 which when the valve is displaced to the left as viewed in Figure 1 couples branch pressure conduit 61 with conduit 57 for actuation of the plunger. When the valve is retracted, conduit 61 is blocked and 57 is connected by way of the cannelure to exhaust or drain conduit 62. A spring 63 interposed between the flange 51 and the top of chamber 48 normally urges the valve downward, the effect of this spring plus the weight of the valve being greater than the resistance of spring 44 so that when not otherwise supported the tracer point will move downward and remain in contact with pattern 35.

The upwardly extending reduced portion 52 of the valve extends into the chamber 49 and is provided with a piston element comprising a central disc 64 having the oppositely extending flanges 65 and 66 providing a rim in relatively close interfitting engagement with the cylindrical circumscribing wall of chamber 49. The radial clearance between these parts is preferably of the nature of about .0025 to .005" so that a double acting dashpot dampening movement of the valve is provided. For effective operation, hydraulic medium under low pressure is preferably introduced into the upper end of the cylinder or chamber 49. This is effected by coupling conduit 18 through suitable resistance 67 and conduit 68 to the valve chamber 69. A valve 70 acting transversely of the chamber and normally held in raised position, as shown by spring 71, couples conduit 72 extending to the upper portion of cylinder 49. This pressure may advantageously be in the nature of not more than four or five pounds to the inch, and to maintain the correct pressure and prevent undue building up of same, there is provided bleed line 73 having therein resistance 74, from which extends the discharge conduit 75, leading into chamber 48. Chamber 48 has extending from the bottom thereof the branch conduit 76 coupled into the reservoir return conduit 27. To prevent formation of an air pocket on the underside of disc 64 impairing the efficiency of the device the flange 66 of the piston is provided with drillings as at 78 so that any air entrained in the system may escape from the underside and by way of the clearance space between the rim and enclosing cylinder and conduit 73. In this manner the low pressure introduced maintains the dashpot system constantly filled with low pressure hydraulic medium.

It will be evident that on tendency for either upward or downward displacement of the valve the interchange of hydraulic medium from the upper to lower side of the piston disc 64 must be by way of the slight spacing between the rim and cylinder, creating a damping effect and preventing undesirable hunting or rapid vibrating movement of the piston.

To prevent retarding of valve movement when rapid retraction of the parts is desired potential pressure conduit 57 is connected through light resistance 79 with conduit 80 coupled with the piston chamber 81 into which a reduced portion of the valve 70 extends. When the valve 58 is shifted to couple pressure with plunger 56 to raise the main control valve into its rapid retraction effecting position the pressure created in chamber 81 will force valve 70 downward against its spring 71, interconnecting conduit 72 with conduit 81' at the lower end of the cylinder or chamber 49 so that the two ends are interconnected and the dashpot action rendered ineffective.

On reverse actuation of valve 58, however, the resistance 79 acts to retard reverse flow of the pressure medium in conduit 80 which is now not under pump pressure but only subject to the force exerted by the reaction of spring 71 against valve 70. This introduces an automatic delay effect with respect to the closing off of the interconnection between 72 and 81' so that the valve 15 has an opportunity rapidly to follow up the tracer point 40 when the plunger piston 56 is connected to exhaust. This affords the tracer valve sufficient time to drop to the rapid down position before the steadying dashpot effect is restored.

It is to be understood that various conventional forms of resistances may be employed at points 67 and 74, for example, but in practice it has been found most advantageous if these are of the viscous type as shown rather than dynamic. Also, while the invention basically will function so long as the dashpot chamber is maintained filled with the viscous damping medium, it has also been found advantageous in practice for most efficient operation if the medium is introduced under pressure only into the upper portion of the chamber, so that a constant but preferably light pressure is maintained in the chamber, and means are provided such as the passages or drillings 78 permitting egress of any entrained air from the underside of the piston, together with a bleeder controlled air drain from the top of the piston chamber so that all air or other medium having a lower compressibility than the oil or hydraulic fluid employed in the system is continuously eliminated from the chamber. Thus, the damper or piston controlled movements of the valve are dependent entirely on the interflow between upper to lower portions of the piston chamber by way of the periphery of the piston so that constant delay action or dampening of incipient vibratory movements is effected under all operating conditions. At the same time the arrangement of resistances shown maintains not only a light pressure within the chamber but minimizes the quantity of flow of the hydraulic pressure medium through conduit 68 so that maximum discharge will at all times be directed toward the operating cylinder 12. It will be noted that the pump 17, in accordance with usual custom, has a capacity in excess of the demands for the maximum rate of movement of the piston 10, the excess being returned to reservoir by way of pressure relief valve 82 and conduit 83.

What is claimed is:

1. A control unit for the actuating piston and cylinder mechanism, of a reproducing machine including a sensitive tracer valve, a dashpot mechanism including a dashpot piston coupled with the valve and means providing a dashpot cylinder in which the dashpot piston is movable, conduits coupled with opposite ends of the dashpot cylinder, a pressure conduit, an intervening valve member alternatively positionable to interconnect the dashpot cylinder coupled conduits or to connect one of said conduits with the pressure conduit, means for shifting the valve member to determine the effectiveness of the dashpot mechanism, said means including a supplemental control circuit for unidirectional reaction on said valve member, a resistance in said circuit, means for alternatively coupling the control circuit with pressure or exhaust to activate or de-energize the circuit, a power shifter for the tracer valve, operative connections between the control circuit and said power shifter whereby the shifter will be activated upon energization of the control circuit, and additional means for reversely actuating the power shifter when the control circuit is connected to exhaust, said operative connections for the power shifter being coupled to the control circuit ahead of the resistance whereby inverse sequential actuations of the power device and the control valve member will be effected upon activation and deenergization of the control circuit.

2. In a tracer valve unit the combination with a tracer valve of the type effective upon slight displacement from neutral to reverse the reaction of a hydraulic circuit of a viscous dampener for reducing hunting of the valve including a housing disposed adjacent the valve and provided with a piston rod guiding aperture and a dashpot cylinder aligned therewith, the valve having a rod portion slidable in the aperture and extending into the dashpot cylinder, a piston carried by the rod comprising a central web having a double flanged rim extending in close proximity to the wall of the dashpot cylinder to provide opposed cup portions on the piston, means for introducing hydraulic medium under pressure into the dashpot cylinder, a hydraulic resistance bleeder coupled with the dashpot cylinder to permit continuous slight flow therefrom to eliminate entrained air, the piston having drainage ports formed in the rim of the cup portion which is in remote relation to the cylinder bleeder whereby entrapped air in said cup will be exhausted therefrom by way of the space intervening the rim and the dashpot cylinder wall to the bleeder.

3. In a tracer valve unit the combination of a tracer valve of the type effective upon slight displacement from neutral to reverse the reaction of a hydraulic circuit of a viscous dampener for reducing hunting of the valve including a housing disposed adjacent the valve and provided with a piston rod guiding aperture and a dashpot cylinder aligned therewith, the valve having a rod portion slidable in the aperture and extending into the dashpot cylinder, a piston carried by the rod comprising a central web having a double flanged rim extending in close proximity to the wall of the dashpot cylinder to provide opposed cup portions on the piston, means for introducing hydraulic medium under pressure into the dashpot cylinder, a hydraulic resistance bleeder coupled with the dashpot cylinder to permit continuous slight flow therefrom to eliminate entrained air, the piston having drainage ports formed in the rim of the cup portion which is in remote relation to the dashpot cylinder bleeder whereby entrapped air in said cup will be exhausted therefrom by way of the space intervening the rim and the dashpot cylinder wall to the bleeder; and means for interconnecting opposite ends of the dashpot cylinder to relieve the damping action of the piston as respects the valve.

4. A control mechanism for the automatic rate and direction of movement determining valve of a reproducing machine, which valve is of the type including a support or housing, an outer valve portion having inlet and outlet ports, a pair of controlled ports and a contained inner free floating valve portion having grooves and lands so related to the inlet and outlet ports and the pair of ports that slight displacement of said inner valve in opposite directions from a neutral position will effect reversal of effective coupling of the inlet and outlet ports with one or the other of the controlled ports and the extent of continued movement of the valve in a selected direction of displacement will determine the potential rate of flow through the inlet and outlet ports; said control mechanism including a dashpot cylinder carried by the housing, a dashpot piston within the dashpot cylinder for dampening slight movements of the free floating valve in either direction to prevent hunting, means coupling said piston with the inner free floating valve, conduits coupled with opposite ends of the dashpot cylinder, a pressure conduit, a dashpot control valve member alternatively positionable to interconnect the dashpot cylinder coupled conduits or to connect one of said conduits with the pressure conduit, and means for shifting the dashpot control valve to determine the effectiveness of the dashpot piston.

5. A control mechanism for the automatic rate and direction of movement determining valve of a reproducing machine, which valve is of the type including a support or housing, an outer valve portion having inlet and outlet ports, a pair of controlled ports and a contained inner free floating valve portion having grooves and lands so related to the inlet and outlet ports and the pair of ports that slight displacement of said inner valve in opposite directions from a neutral position will effect reversal of effective coupling of the inlet and outlet ports with one or the other of the controlled ports and the extent of continued movement of the valve in a selected direction of displacement will determine the potential rate of flow through the inlet and outlet ports, said control mechanism including a dashpot cylinder carried by the housing, a dashpot piston within the dashpot cylinder for dampening slight movements of the free floating valve in either direction to prevent hunting, means coupling said piston with the inner free floating valve, conduits coupled with opposite ends of the dashpot cylinder, a pressure conduit, a dashpot control valve member alternatively positionable to interconnect the dashpot cylinder coupled conduits or to connect one of said conduits with the pressure conduit, and means for shifting the dashpot control valve to determine the effectiveness of the dashpot piston, said means including a piston on the dashpot control valve, a valve piston cylinder receiving the valve piston, a conduit coupled with the valve piston cylinder, an exhaust conduit, and a valve for alternatively connecting the pressure or the exhaust conduit with the valve piston cylinder coupled conduit for introduction or relief of actuating pressure therein.

6. A control mechanism for the automatic rate and direction of movement determining valve of a reproducing machine, which valve is of the type including a support or housing, an outer valve portion having inlet and outlet ports, a pair of controlled ports and a contained inner free floating valve portion having grooves and lands so related to the inlet and outlet ports and the pair of ports that slight displacement of said inner valve in opposite directions from a neutral position will effect reversal of effective coupling of the inlet and outlet ports with one or the other of the controlled ports and the extent of continued movement of the valve in a selected direction of displacement will determine the potential rate of flow through the inlet and outlet ports, said control mechanism including a dash pot cylinder carried by the housing, a dash pot piston within the dashpot cylinder for dampening slight movements of the free floating valve in either direction to prevent hunting, means coupling said piston with the inner free floating valve, conduits coupled with opposite ends of the dash pot cylinder, a pressure conduit, a dashpot control valve member alternatively positionable to interconnect the dashpot cylinder coupled conduits or to connect one of the said conduits with the pressure conduit, means for shifting the dashpot control valve to determine the effectiveness of the dash pot piston, said means including a piston for the dashpot control valve, a valve piston cylinder receiving the valve piston, a conduit coupled with the valve piston cylinder, an exhaust conduit, and a selector valve for alternatively connecting the pressure or exahust conduit with the valve piston cylinder coupled conduit for introduction or relief of actuating pressure therein, and a hydraulic resistance element intermediate the said selector valve and the valve piston cylinder for retarding the flow to and from the valve piston cylinder.

7. A control mechanism for the automatic rate and direction of movement determining valve of a reproducing machine, which valve is of the type including a support or housing, an outer valve portion having inlet and outlet ports, a pair of controlled ports and a contained inner free floating valve portion having grooves and lands so related to the inlet and outlet ports and the pair of ports that slight displacement of said inner valve in opposite directions from a neutral position will effect reversal of effective coupling of the inlet and outlet ports with one or the other of the controlled ports and the extent of continued movement of the valve in a selected direction of displacement will determine the potential rate of flow through the inlet and outlet ports, said control mechanism including a dash pot cylinder carried by the housing, a dash pot piston within the dashpot cylinder for dampening slight movements of the free floating valve in either direction to prevent hunting, means coupling said piston with the inner free floating valve, conduits coupled with opposite ends of the dash pot cylinder, a pressure conduit, a dashpot control valve member alternatively positionable to interconnect the dashpot cylinder coupled conduits or to connect one of the said conduits with the pressure conduit, means for shifting the dashpot control valve to determine the effectiveness of the dash pot piston, said means including a piston for the dashpot control valve, a valve piston cylinder receiving the valve piston, a conduit coupled with the valve piston cylinder, an exhaust conduit, and a valve for alternatively connecting the pressure or exhaust conduit with the valve piston cylinder coupled conduit for introduction or relief of actuating pressure therein, a hydraulic resistance element intermediate the said valve and the valve piston cylinder for retarding the flow to and from the valve piston cylinder, and additional means for effecting reverse actuation of the valve piston and dashpot control valve at the rate determined by the flow of actuating medium from the dashpot control valve cylinder through the resistance when the dashpot control valve cylinder is connected to the exhaust conduit.

8. A control mechanism for the automatic rate and direction of movement determining valve of a reproducing machine, which valve is of the type including a support or housing, an outer valve portion having inlet and outlet ports and a pair of controlled ports and a contained inner free floating valve portion having grooves and lands so related to the inlet and outlet ports and the pair of ports that slight displacement of said inner valve in opposite direction from a neutral position will effect reversal of effective coupling of the inlet and outlet ports with one or the other of the controlled ports and the extent of continued movement of the valve in a selected direction of displacement will determine the potential rate of flow through the inlet and outlet ports, said control mechanism including a dash pot cylinder carried by the housing, a dash pot piston within the dashpot cylinder for dampening slight movements of the free floating valve in either direction to prevent hunting, means coupling said piston with the inner free floating valve, conduits coupled with opposite ends of the dash pot cylinder, a pressure conduit, a dashpot control valve member alternatively positionable to interconnect the dashpot cylinder coupled conduits, or to connect one of the said conduits with the pressure conduit, means for shifting the dashpot control valve to determine the effectiveness of the dash pot piston including a piston on the dashpot control valve, a valve piston cylinder for the latter piston, a conduit coupled with the valve piston cylinder, an exhaust conduit, and a valve for alternatively connecting the pressure or exhaust conduit with the valve piston cylinder coupled conduit for introduction or relief of actuating pressure therein, a power shifter for the floating valve, and a hydraulic conduit connecting the valve piston cylinder and said power shifter, whereby the shifter will be activated when the valve piston cylinder is coupled to the pressure conduit.

9. A control mechanism for the automatic rate and direction of movement determining valve of a reproducing machine, which valve is of the type including a support or housing, an outer valve portion having inlet and outlet ports and a pair of controlled ports and a contained inner free floating valve portion having grooves and lands so related to the inlet and outlet ports and the pair of ports that slight displacement of said inner valve in opposite directions from a neutral position will effect reversal of effective coupling of the inlet and outlet ports with one or the other of the controlled ports and the extent of continued movement of the valve in a selected direction of displacement will determine the potential rate of flow through the inlet and outlet ports, said control mechanism including a dash pot cylinder carried by the housing, a dash pot piston within the dashpot cylinder, for dampening slight movements of the free floating valve in either direction to prevent hunting, means coupling said piston with the inner free floating valve, conduits coupled with opposite ends of the dash pot cylinder, a pressure conduit, a dashpot control valve member alternatively positionable to interconnect the dashpot cylinder coupled conduits or to connect one of the said conduits with the pressure conduit, means for shifting the dashpot control valve to determine the effectiveness of the dash pot piston including a piston on the dashpot control valve, a valve piston cylinder for the latter piston, a conduit coupled with the valve piston cylinder, an exhaust conduit, and a valve for alternatively connecting one or the other of said last mentioned conduits with the valve piston cylinder coupled conduit for introduction or the relief of actuating pressure therein, a power shifter for the floating valve, and a hydraulic conduit connecting the valve piston cylinder and said power shifter, whereby the shifter will be activated when the valve piston cylinder is coupled to the pressure conduit, and additional means for reversely actuating the power shifter when the valve piston cylinder is connected to the exhaust conduit.

ROBERT R. ADAMS.
RAYMOND D. WORTENDYKE.

REFERENCES CITED

The following references are of record in the file of this patent:

UNITED STATES PATENTS

| Number | Name | Date |
|---|---|---|
| 1,285,521 | Wiberg | Nov. 19, 1918 |
| 1,347,017 | Davies | July 20, 1920 |
| 1,453,733 | Thomas | May 1, 1923 |
| 1,560,439 | Trenor | Nov. 3, 1925 |
| 1,950,685 | McGee | Mar. 13, 1934 |
| 2,068,889 | Roehm | Jan. 26, 1937 |
| 2,403,321 | Spaink et al. | July 2, 1946 |
| 2,412,549 | Yates | Dec. 10, 1946 |